United States Patent
Schneider et al.

(10) Patent No.: US 8,360,107 B2
(45) Date of Patent: Jan. 29, 2013

(54) PRESSURE COMPENSATING DEVICE FOR FLUID-CONDUCTING SYSTEMS

(76) Inventors: Peter Schneider, Alterswil (CH);
Charles Aebischer, St. Antoni (CH)

( * ) Notice: Subject to any disclaimer, the term of this patent is extended or adjusted under 35 U.S.C. 154(b) by 100 days.

(21) Appl. No.: 13/065,675

(22) Filed: Mar. 28, 2011

(65) Prior Publication Data

US 2011/0240161 A1    Oct. 6, 2011

(30) Foreign Application Priority Data

Mar. 26, 2010    (CH) ..................................... 0445/10

(51) Int. Cl.
*F16L 55/04*    (2006.01)
(52) U.S. Cl. ............. 138/30; 138/26; 220/721; 220/723
(58) Field of Classification Search .................... 138/26, 138/30; 220/721, 723, 720
See application file for complete search history.

(56) References Cited

U.S. PATENT DOCUMENTS

| | | | | |
|---|---|---|---|---|
| 2,016,247 A | * | 10/1935 | Simmons | 174/12 R |
| 2,401,792 A | * | 6/1946 | Overbeke | 138/30 |
| 4,166,478 A | * | 9/1979 | Sugimura et al. | 138/30 |
| 4,610,369 A | * | 9/1986 | Mercier | 220/721 |
| 4,615,320 A | * | 10/1986 | Fehrenbach et al. | 123/467 |
| 6,957,669 B2 | * | 10/2005 | Suzuki et al. | 138/30 |
| 7,690,399 B2 | * | 4/2010 | Young | 138/30 |
| 7,950,417 B2 | * | 5/2011 | Young | 138/30 |
| 2003/0089410 A1 | * | 5/2003 | Young | 138/30 |
| 2008/0099093 A1 | * | 5/2008 | Young | 138/30 |

* cited by examiner

Primary Examiner — Patrick F Brinson
(74) Attorney, Agent, or Firm — Adams & Wilks

(57) ABSTRACT

The invention relates to a pressure compensating device for fluid-conducting systems, with a pressure container (1) for the pressure compensation, an elastic diaphragm (3), which forms a cavity (5) for receiving the fluid, and a pressure chamber of gas (7) adjoining the cavity (5). The diaphragm (3) is connected via a connecting mount (15) to a connecting pipe (17) for the fluid. A pipe (21) for the fluid, led separately to the connecting pipe (17), extends via the connecting mount (15) into the cavity (5), while being concentrically encircled by a hollow cylinder (25) shaped like a sieve, which defines an annular space (27) and opens into an end piece (29), into which the pipe (21) opens. Moreover the end piece (29) features sieve-like perforations (31) for the fluid to flow out into the cavity (5). The separately led pipe (21) extends into the fluid-conducting system, while the connecting pipe (17) for the fluid opens into the fluid-conducting system.

3 Claims, 3 Drawing Sheets

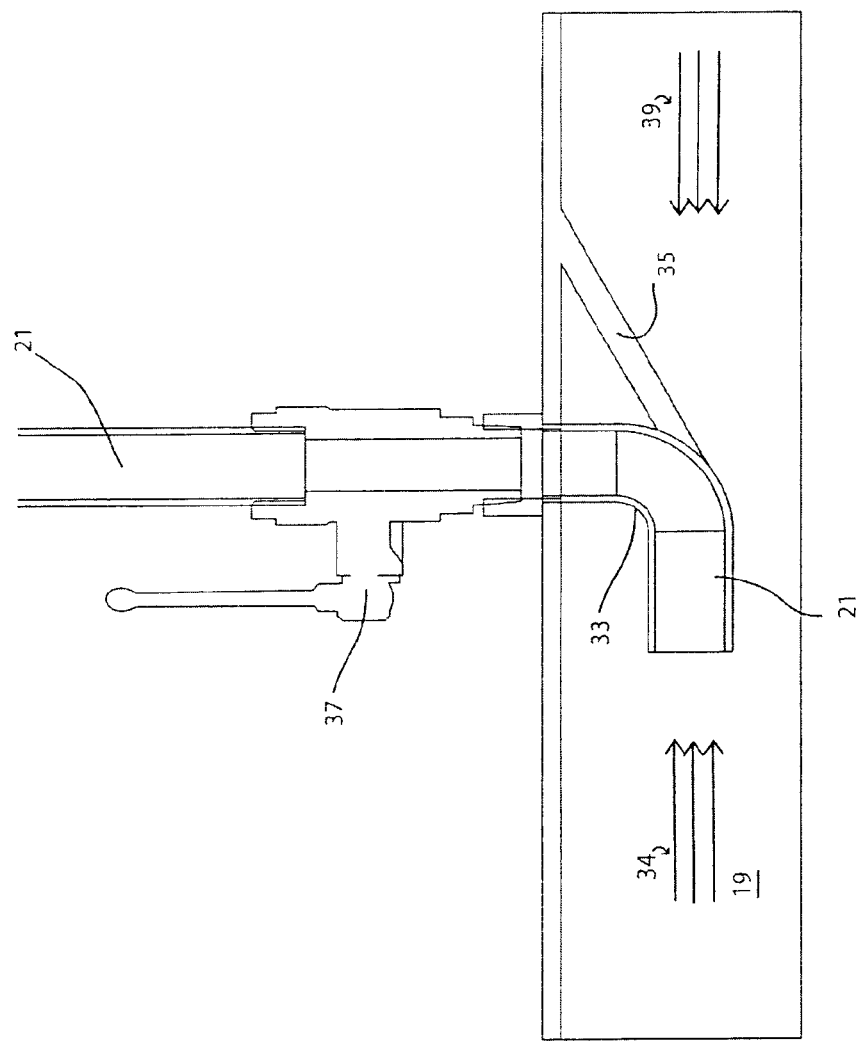

PRESSURE COMPENSATING DEVICE FOR FLUID-CONDUCTING SYSTEMS

Figure 1:
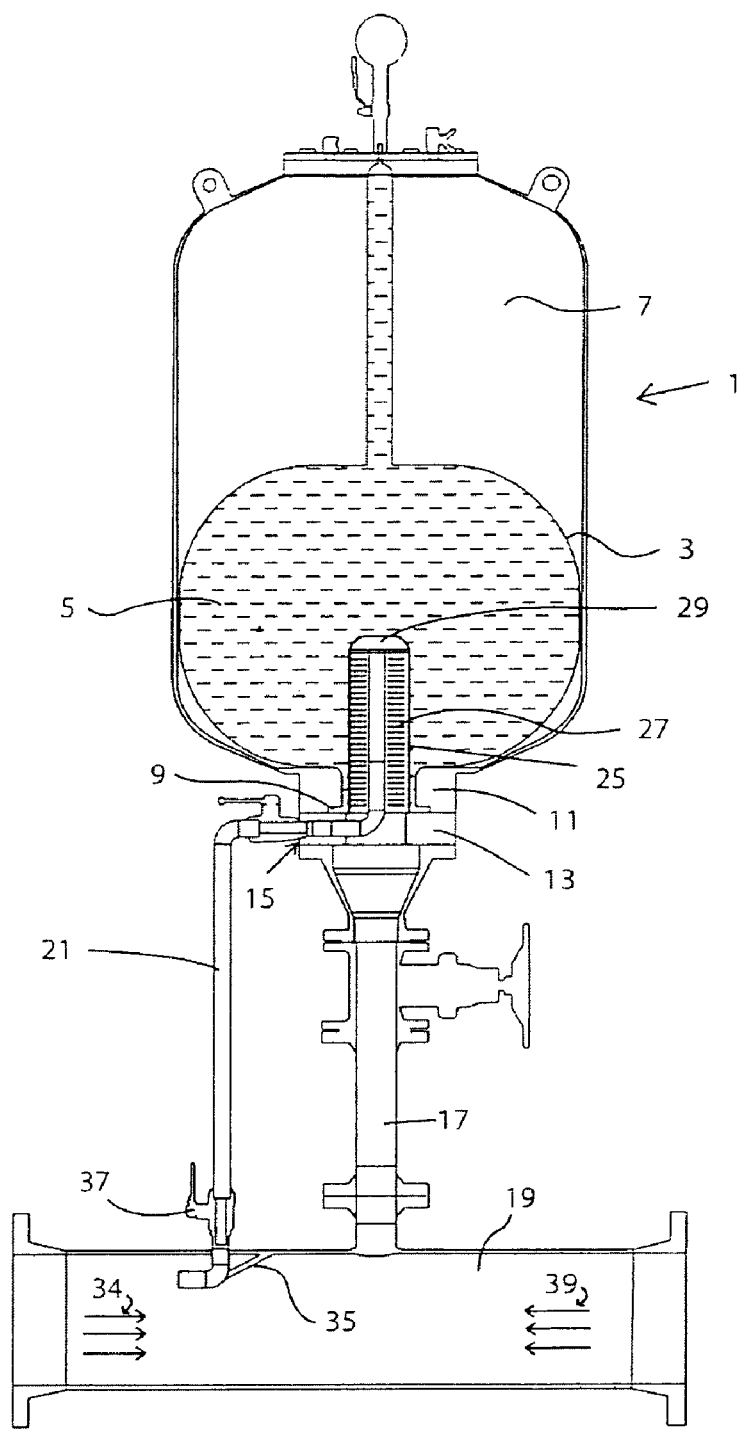

The invention relates to a pressure compensating device for fluid-conducting systems, which is fitted with a pressure container for the pressure compensation, with an elastic diaphragm which forms a cavity for receiving the fluid, and a pressurized gas chamber adjoining the cavity, and where the diaphragm is connected to a connecting pipe for the fluid via a connecting mount. The invention similarly relates to preferred applications of this pressure compensation device.

Such pressure compensation devices can, among other things, be used as attenuator against hydraulic shocks and to reduce pulsations in pipes bearing water, waste water or other fluid media.

Hydraulic shocks (water hammer/fluid hammer) in piping systems, such as water supply and waste water disposal pipes, are sinusoidal pressure waves which may be caused by a sudden release or interruption of the water flow, because water is non-compressible. They happen for example because of the quick opening or closing of fixtures, such as mixer taps, or valves, and similarly when pumps are directly switched on or off, or when there is a power cut in pump stations, and by opening or closing hydrants in fire hose pipes.

Hydraulic shocks cause pressure fluctuations, which can amount to several times the normal pipeline pressure. By this repeated, short-term pressure increase the pipe system is highly stressed. This can lead to the failure of valve fittings and to other types of damage in the pipe system.

In order to attenuate the amplitude of such pressure waves sufficiently to ensure on the one hand that no damages occur to the pipe system, and on the other hand that the noise disturbance accompanying the hydraulic shocks is minimised, the use of so-called hydraulic shock absorbers (water hammer arrestors) is known.

These hydraulic shock absorbers consist basically of a pressure vessel filled with gas, and positioned in the pressure vessel a diaphragm, which is usually made of an elastic synthetic material, which holds the water or more generally the liquid, and which is connected to the pipe system via an opening in the pressure container. This opening at the same time serves as diaphragm connector and ensures a safe separation of the liquid and the gas. Generally nitrogen or air are used for the gas.

By using such an arrangement it is possible to absorb hydraulic shocks in the form of a high surge in pressure in the case of overpressure, and also those in the form of a drop in pressure caused by negative pressure.

Basically such hydraulic shock absorbers are in fact also used as energy-storage devices and pulsation attenuators, and as pressure accumulator and pressure expansion tanks, in the heating sector and generally in the field of potable water and foodstuff supply installations. As pressure expansion tanks they can, for example in potable water heaters, also serve to balance out fluctuations in volume caused by changes in temperature.

When using the aforesaid pressure-compensating devices in the field of potable water or foodstuff supply installations, one generally encounters the problem of microbial pollution. On the inner side of the diaphragm, where the liquid is, a bacterial slime may form, which may then get suddenly dislodged when large pressure waves occur, and so pass into the potable water or foodstuff supply system. Moreover the liquid in the diaphragm may be subject to too high a level of microbial pollution if it is left to stand for longer periods without large pressure loads while the installation is kept running at a constant level. Therefore there is a need to prevent the growth of germs in such pressure containers as far as possible.

To achieve this, in DE 199 45 105 A1 it is proposed, for a generic pressure container for supply installations in the form of water-conducting systems, to fit the diaphragm with a lining that hinders the growth of microbes. For this purpose the rubber diaphragm has a lining in the form of a thin-walled sheet or a synthetic material, or of natural rubber or some other natural material, preferably however a lining in the form of a polyamide coating.

This does not solve, at least does not adequately solve, the problem of there being a static, unreplaced volume of water when the system is kept running at a steady level, i.e. without significant pressure fluctuations.

Contrasted to this, from DE 42 42 036 A1 there is known a device with a pressure container which serves as expansion vessel for heated potable water in a closed vessel, e.g. for exchanging heat with heating water, and which makes possible a forced replacement of the water present in the expansion vessel via a connecting fixture. In order to achieve this, DE 42 42 036 A1 proposes basically two embodiments. According to the first design, which is easier to realise, the entire water flow leading to the potable water heater is led through the expansion vessel. To do this there is proposed an inlet pipe which protrudes into the cavity through an off-centre inlet, through which a stream is produced passing more or less transversely through the cavity to an outlet which is likewise positioned off-centre. Even the document itself correctly points out the losses in pressure which occur in this water flow arrangement.

An alternative design which is much more demanding to realise is proposed for the forced replacement of the water, in which the main stream of the potable water flows undiverted from an input to an exit, and only a side stream is led into the cavity of the expansion vessel. For this purpose a connecting fixture is provided, with inlet and outlet positioned adjacent to each other. As was the case in the first design, the flow direction in the connection valve is still oriented parallel to the direct channel of flow. Now in the section with the inlet and outlet there is a partition wall between them featuring an orifice. This causes a suction effect for the water flowing in from the potable water pipe, opposite to the direction of flow. Therefore only a part of the water is actually led into the cavity. Most of it flows out again along with the water flowing out of the cavity. In this manner a forced replacement of the water is indeed achieved, without leading the entire water stream through the expansion vessel, however the connecting fixture provided for this purpose is technically highly demanding to manufacture.

Contrasted to this, the German utility model DE 200 02 709 U1 now proposes a device for forced flow through expansion vessels, in which a generically designed pressure container is fitted with a connecting mount in the area of the container opening, for connecting to a potable water supply pipe. The clear cross-sectional area of this connecting mount is subdivided by a guide fixture into an inflow surface and an outflow surface, which are of different sizes. In this manner a portion of the fresh water is led into the expansion vessel, while different flow speeds are set up due to the differently sized inflow and outflow surfaces. This is intended to achieve a thorough mixing and flushing through of the water in the expansion vessel.

Even if this device does not need valves and thus allows a simplified design, here too there still remains the disadvantage that the differently sized inflow and outflow surfaces have to be realised via an odd number of guide surfaces arranged in a star-shape, which is similarly demanding technically to manufacture.

DE 200 14 804 U1 solves the problem of forcing the flow through the expansion vessels by a connection device which has a connecting mount in which there is a centrally-positioned flow-guide device in the form of a pipe. The diameter of this pipe-shaped flow-guide device is smaller than that of the connecting mount, so that an annular space is formed there. In one embodiment a partial flow of the water from a potable water supply is led through the pipe-shaped flow-guide device. For this the pipe has a bend which extends into a T-piece. This connects the connecting mount to the potable water supply. In this embodiment the bend opens in the direction of the water inflow. The opposed upper end of the pipe-shaped flow-guide device ends in a flow-ring, which is located above an empty space. The flow-ring has orifices for flow into the expansion vessel. The water passes through these to enter the expansion vessel. The diameter of the flow-ring is approximately the same as that of the connecting mount and thus forms the free space. The latter in turn serves to lead back the water from the expansion vessel via the annular space which is arranged concentrically to the pipe-shaped flow-guide device, back to the potable water supply. In this manner one achieves both a replacement and also a thorough stirring of the water in the expansion vessel, the moment water is withdrawn from the potable water supply system.

According to another embodiment, the bend opens to the opposite direction against the water flow direction. Then the water is not led through the flow-guide device, but through the annular space and through the side flow orifices fitted there on the upper end, and so fed into the expansion vessel. Water from the expansion vessel is then led back again via the pipe-shaped flow-guide device to the potable water supply.

Starting from this prior art, the present invention therefore has the original objective of producing a pressure compensation device for fluid-conducting systems which can be used as hydraulic shock absorber e.g. in plumbing installations, as pressure accumulator and expansion vessel, in the field of foodstuffs, including the supply of potable water, in the field of heating, and also as energy storage device and pulsation attenuator, while making possible a simple and yet well-directed stirring and flushing through of the liquid in the pressure compensation device.

According to the invention this objective is solved by a pressure compensation device for fluid-conducting systems which features a pressure container for the pressure compensation, with an elastic diaphragm, which forms a cavity for receiving the fluid, and a pressurized gas chamber adjoining the cavity; where the diaphragm is connected to a connecting pipe for the fluid via a connector, preferably in the form of a connecting mount; and there is a separately led pipe for the fluid passing via the connector, preferably the connecting mount, which extends into the cavity; and which is encircled concentrically by a hollow cylinder formed like a sieve, which defines an annular space and opens into an end piece into which the pipe opens; and which has sieve-like perforations for the outflow of the fluid into the cavity; and where the separately led pipe protrudes into the fluid-conducting system, and the connecting pipe for the fluid opens into the fluid-conducting system.

By providing a separately-led pipe which extends into the cavity, and which is concentrically encircled by the hollow cylinder shaped like a sieve, a forced flow through the pressure container is made possible using a simple construction, which keeps down the microbial pollution of the fluid in the pressure container at a low level. Here this separately-led pipe can be formed both as inlet pipe or as outlet pipe, depending on whether the flow direction of the fluid in the fluid-conducting system allows the fluid to flow directly into the pipe or not. In this manner a pressure compensation device is produced which can be used independent of the local conditions and in particular which allows an independent positioning of the pressure container.

Preferably the diaphragm forming the cavity is designed as bladder diaphragm and made of a food-safe synthetic or natural material. For this one may select rubber in the form of natural or synthetic rubber.

According to one embodiment of the inventive pressure compensation device, the connector is designed in the form of a connecting mount. Furthermore the diaphragm has a border by means of which it is held pressed between a flange of the pressure container and a flange of the connecting mount; where because the flange of the connecting mount has a smaller inner diameter than the flange of the pressure container it defines a protruding ledge.

In this manner one can arrange for the hollow cylinder shaped in the form of a sieve to be mounted on the protruding ledge, as it concentrically encircles the pipe in the region where it extends into the cavity.

In this manner an annular space can be defined between the outside circumference of the pipe and that of the hollow cylinder, which opens into an end piece which is shaped like a cover but is hollow.

The pipe may open into the end piece, where here the end piece preferably has sieve-like perforations on the boundary located opposite to this orifice of the inlet pipe.

The invention also relates to applications of the pressure compensation device in the designs which have been described above.

Thus the inventive pressure compensation device can be used as hydraulic shock and pulsation attenuator in water supply and water disposal installations. This basically covers the whole field of plumbing installations.

Another preferred use involves the application as pressure accumulator and expansion vessel. When used as such an expansion vessel, the inventive pressure compensation device is, for example, used in connection with a potable water heater. If warm water is withdrawn from the potable water heater, more cold water flows in and is again heated. This heating process causes the water, and thus at the same time also the cavity of the pressure container, to expand more, thereby compressing the volume of gas in the pressure chamber holding the gas.

A specially preferred use involves the application in the field of foodstuffs, including the potable water supply. Concerning the field of foodstuffs, here one can in particular mention the production of beverages. In such cases there will be e.g. fruit juice instead of water in the fluid-conducting system.

Other applications of the invention that one can also mention are the use in the field of heating and as energy storage device.

In what follows the invention will be described in more detail with the help of design examples and the enclosed drawing.

Shown are:

FIG. 1 a partly cut-out view of an inventive pressure compensation device and its connection to a potable water installation.

Figure 2:
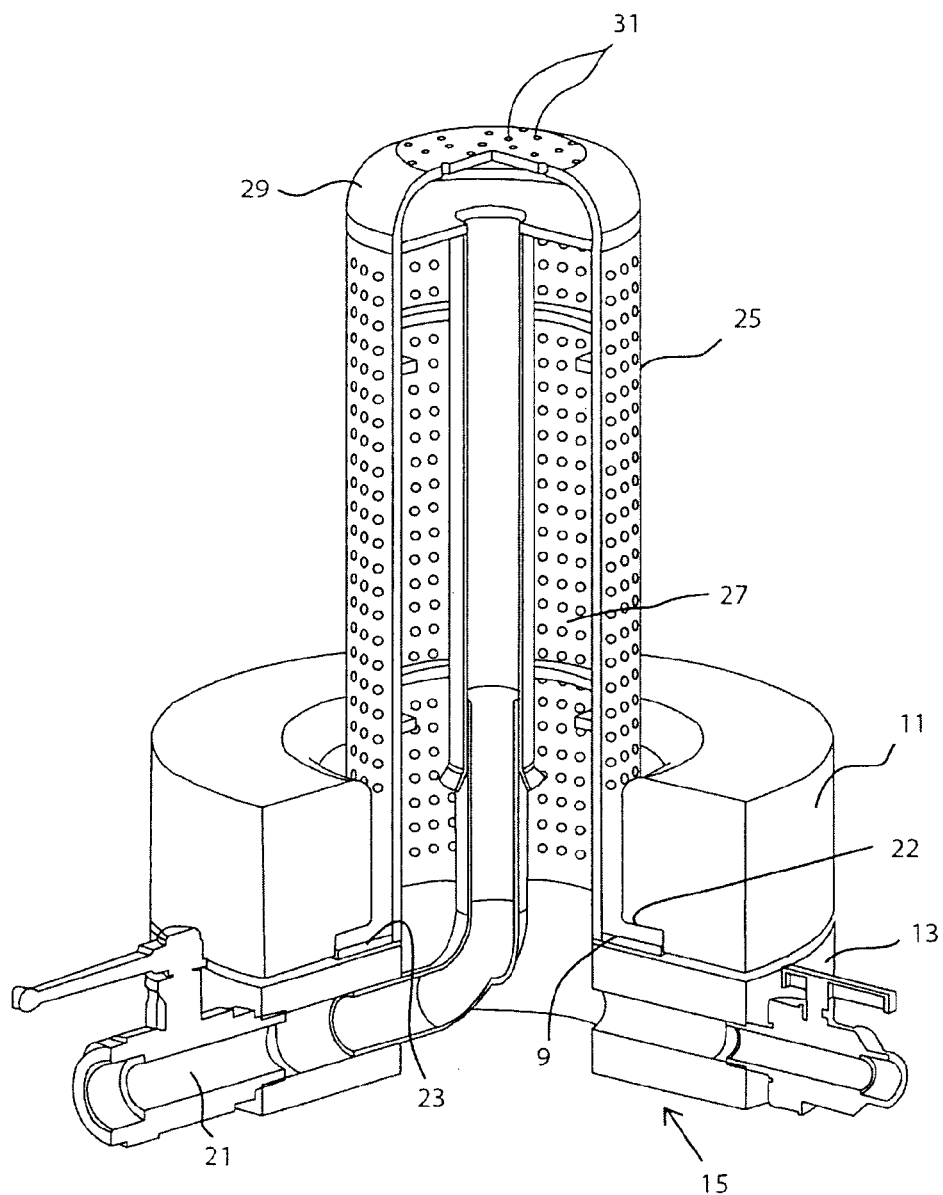

FIG. 2 a section, shown larger than in FIG. 1, of the pressure compensation device in the region of the sieve-like hollow cylinder with flange and pipe, in a partly cut-out view, and FIG. 3 a section, shown larger than in FIG. 1, of the pressure compensation device in the region of the connection of the pipe to the fluid-conducting system, as plain view.

In FIG. 1 a pressure compensation device for fluid-conducting systems is shown, which features a pressure container designated as a whole by the reference number 1. Inside this there is positioned an elastic diaphragm 3, designed as a bladder diaphragm, which defines a cavity 5, which is at least partially filled with fluid which is flowing through the system. For the purpose of explaining the inventive pressure compensation device, this embodiment is presented with reference to a potable water supply installation, by way of example and non-restrictively. For this the elastic diaphragm 3 is made of a rubber suitable for use with foodstuffs. Above the diaphragm 3 which defines the cavity 5, there is a pressure chamber filled with gas 7. Here nitrogen is used as the gas. It is, however, also possible to use other gases, such as air or also combinations of two or more different gases. The nitrogen gas filled in the chamber forms a damping section, which can be used either to absorb excess energy or to release additional energy.

The elastic diaphragm 3 separates the gas pressure chamber 7, which is filled with nitrogen gas, from the cavity 5, in such a way that basically no diffusion of the nitrogen into the cavity 5, nor any discharging of it into the downstream pipes, can take place.

For this purpose the diaphragm 3 is held pressed on its border 9 between a flange 11 of the pressure container 1 and a flange 13 of a connecting mount which is designated as a whole by 15. Adjoining the connecting mount 15 there is a connecting pipe 17 for the fluid, in this case water, which opens into a flow channel 19 of the potable water supply installation the rest of which is not shown in detail here.

A pipe 21 for water is led separately, and therefore independent of the connecting pipe 17, which depending on the design can be either designed as inlet or outlet pipe for water. In the embodiment described here it serves as inlet pipe and is thus fed from the flow channel 19. According to another embodiment of the present invention, which will be described in more detail below, the pipe 21 can be designed as an outlet pipe. The following general descriptions about this inlet or outlet pipe applies equally to both embodiments.

The pipe 21 is led into the cavity 5 via a channel 22 in the flange 13 of the connecting mount 15, and extends right into this cavity.

As FIG. 2 shows, the flange 13 of the connecting mount 15 has a smaller inner diameter than the flange 11 of the pressure container 1. In this way the flange 13 of the connecting mount 15 forms a protruding ledge 23, on which is mounted a hollow cylinder 25 shaped as a sieve, which concentrically encircles the pipe 21 in the region where the latter extends into the cavity 5. Here an annular space 27 is defined between the outer circumference of the pipe 21 and the hollow cylinder 25, which opens into a cap-like, hollow end piece 29. The pipe 21 connects to and opens into this end piece 29. On the boundary of the end piece 29 which is opposite this opening of the pipe 21, there are sieve-like perforations 31, clearly visible in FIG. 2, for the outflow of water into the cavity 5.

In FIG. 3 part of the inventive pressure compensation device is again shown, in enlarged view, the part in which the separately led pipe 21 extends into the fluid-conducting system; in this embodiment it extends into the flow channel 19 of the potable water installation. Here the flow channel 19 can be a main pipe of the potable water installation or a connecting piece, e.g. in the form of a T-piece. The part of the pipe 21 extending into the flow channel 19 features a bend 33, of about 90°. This makes the pipe 21, in this embodiment, open in a direction opposite to the water flow in the flow channel 19. The water flow direction which applies in this case is indicated in FIG. 3 by arrows 34 in the direction towards the opening of the pipe 21.

The section of the pipe 21 protruding into the flow channel 19 can be fitted with a bar 35 for stabilising it, as shown in FIG. 3. In this case the bar 35 is fixed to the pipe 21, in the region of the bend 33, and to the inner wall of the flow channel 19. It is not absolutely necessary to have such a bar 35, though. It can be left out without impairing the stability, for example if the pipe 21 is welded in place.

The pipe 21 also features shut-off valves 37, 37' for the purpose of maintenance and repair works and suchlike.

If the pipe 21, as described in this embodiment, opens into the flow channel in the direction opposite to that of the water flow, then the water in the region of this orifice flows into the pipe 21, which thus functions as inlet pipe. The narrowing of the cross-section produced in this manner provides an acceleration of the flow speed and thus a sufficient kinetic energy to transport the water out from the pipe 21 into the cavity 5 of the pressure container 1. Here the water passes through the end piece 29 of the sieve-like hollow cylinder and the sieve-like perforations 31 in the end piece 29. In this way it is further ensured that the water is stirred up on exiting into the cavity 5, so that the new water flowing in through the pipe 21 into the cavity 5 can mix well with the water that is already there.

Moreover, just as the water flows out from the pipe 21 via the sieve-like perforations 31 in the region of the end piece 29 into the cavity 5, the water present in the cavity 5 can likewise flow via the perforations of the hollow cylinder 25 shaped as a sieve, into the annular space 27, and on from there via the connecting pipe 17 back into the flow channel 19 of the potable water installation.

In this manner a forced flow through the cavity 5 formed by the diaphragm 3 is secured, which effectively prevents the settling and proliferation of bacteria.

For practical reasons it may be necessary to have the pressure container 1 located in a place where it is not directly adjacent to the flow channel 19 of the potable water installation, so that there may then also be produced a course of flow as indicated in FIG. 3 by the arrows 39. In this course of flow the pipe 21 no longer opens in the opposite direction to the flow of the water of the flow channel 19, but goes the other way. Thus the course of flow of the water in the pressure compensation device is reversed accordingly. The water is no longer led into the orifice of the pipe 21, but an opposite, suction effect arises due to the Venturi effect by Bernoulli's law, which leads water out from the pipe 21 and into the flow channel 19.

Thus in this alternative embodiment the connecting pipe 17 serves to transport water out from the flow channel 19 into the cavity 5 of the pressure container 1. Here the water passes through the perforations in the hollow cylinder 25 shaped as a sieve, into the annular space 25, to thus enter into the cavity 5. Here, too, a stirring up of the water as it exits into the cavity 5 is ensured, so that the water flowing into the cavity 5 in this manner can here too be mixed well with the water that is already there.

Thus a quantity of water comparable to the amount flowing in is then fed in the opposite direction via the sieve-like perforations 31 of the end piece 29 into the sieve-like hollow cylinder 25, and on into the pipe 21, which in this manner serves as outlet pipe, from where it flow outs, accelerated by the suction effect described above, into the flow channel 19.

This alternative embodiment, in which the water is made to flow in the pipe 21 and the connecting pipe 17 in a direction opposite to that of the first embodiment, means that the inventive pressure compensation device can be used everywhere independent of the place where it is installed, and in particular allows an independent positioning of the pressure container. The water does not necessarily have to first flow past the pipe 21, it can alternatively be led via the connecting pipe 17.

Here no modification of the device itself is required, because the water flow direction together with the laws of fluid flow motion determines whether the pipe 21 functions as inlet pipe as specified in the first embodiment, or as exit pipe, with the flow conditions reversed, as specified in the other, alternative embodiment. Investigations have, moreover, shown that the inventive pressure compensation device causes significantly lower frictional losses in the flow of fluid as we find is the case in the prior art.

Investigations have moreover shown that the inventive pressure compensation device causes significantly lower frictional losses in the fluid flow than is the case in the known prior art.

The invention claimed is:

1. Pressure compensating device for fluid-conducting systems, which features a pressure container (1) for the pressure compensation; with an elastic diaphragm (3), which forms a cavity (5) for receiving the fluid, and a pressure chamber of gas (7) adjoining the cavity (5) where the diaphragm (3) is connected via a connector to a connecting pipe (17) for the fluid, a separately led pipe (21) for the fluid extends via the connector into the cavity (5), while being concentrically encircled by a sieve-like hollow cylinder (25) which defines an annular space (27) between the hollow cylinder and the led pipe and opens into an end piece (29), into which the pipe (21) opens, and which features sieve-like perforations (31) for the fluid to flow out into the cavity (5), and where the separately led pipe (21) extends into the fluid-conducting system, and the connecting pipe (17) for the fluid opens into the fluid-conducting system.

2. Pressure compensating device according to claim 1, characterized in that the diaphragm (3) is formed as a bladder diaphragm and made of a food-safe synthetic or natural material.

3. Pressure compensating device according to claim 2, characterized in that the synthetic or natural material is selected to be rubber in the form of natural or synthetic rubber.

* * * * *